(12) United States Patent
Katsumata (10) Patent No.: US 8,303,219 B2
(45) Date of Patent: Nov. 6, 2012

(54) METHOD FOR REMOVING CHIPS ON CUTTING MACHINE AND APPARATUS THEREFOR

(75) Inventor: Ikuo Katsumata, Toyohashi (JP)

(73) Assignee: Musashi Seimitsu Industry Co., Ltd., Toyohashi (JP)

( * ) Notice: Subject to any disclaimer, the term of this patent is extended or adjusted under 35 U.S.C. 154(b) by 895 days.

(21) Appl. No.: 12/382,929

(22) Filed: Mar. 26, 2009

(65) Prior Publication Data

US 2009/0245960 A1 Oct. 1, 2009

(30) Foreign Application Priority Data

Mar. 31, 2008 (JP) .................................. 2008-091352

(51) Int. Cl.
*B23Q 11/00* (2006.01)
(52) U.S. Cl. ............................ 409/131; 409/137; 409/62
(58) Field of Classification Search .................... 409/11, 409/62, 131, 132, 137; 408/67; 15/301, 15/303; 407/23, 114
See application file for complete search history.

(56) References Cited

U.S. PATENT DOCUMENTS 6,059,702 A * 5/2000 Winkler et al. ................. 483/13

FOREIGN PATENT DOCUMENTS

| JP | A-2001-47311 | 2/2001 |
| JP | A-2002-254245 | 9/2002 |
| JP | A-2006-326761 | 12/2006 |
| JP | 2007307651 A * | 11/2007 |

* cited by examiner

*Primary Examiner* — Daniel Howell
*Assistant Examiner* — Justin Sikorski
(74) *Attorney, Agent, or Firm* — Oliff & Berridge, PLC (57) ABSTRACT

The present invention relates to a method for removing chips on a cutting machine. The method includes: a first step in which an air supplied from an air supply source is introduced to a first opening and is ejected from the first opening, so that an airflow having a predetermined chip blowing force is blown onto a first region among surfaces of respective parts of the cutting machine and respective parts of a work; and a second step in which a moving member having a communication path extending from an air inlet port to a second opening is moved to a position at which the air inlet port is communicated with the first opening, so that the air is ejected from the second opening and thus an airflow having a predetermined chip blowing force is blown onto a second region among the surfaces of the respective parts of the cutting machine and the respective parts of the work.

7 Claims, 5 Drawing Sheets

METHOD FOR REMOVING CHIPS ON CUTTING MACHINE AND APPARATUS THEREFOR

FIELD OF THE INVENTION

The present invention relates to a method for removing chips on a cutting machine, the chips being generated when a work is cut, and an apparatus therefore.

BACKGROUND ART

Figure 5:
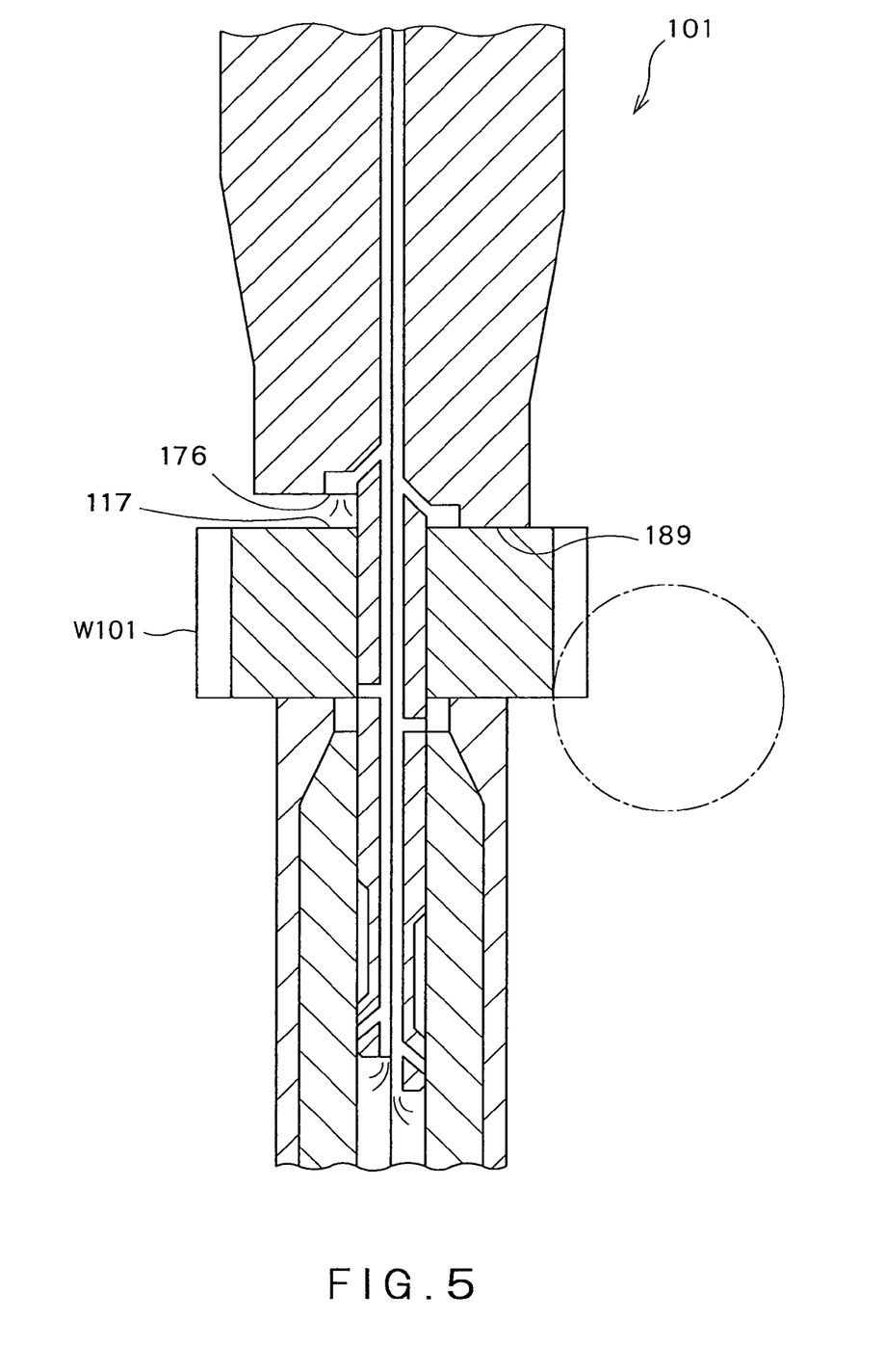
FIG. 5 is a sectional view of a conventional cutting machine. A left half section shows a state in which a work is not yet pressed and fixed, and a right half section shows a state in which a work has been already pressed and fixed.

As shown in FIG. 5, a conventional cutting machine 101, such as a hobbing machine, is provided with a supporting part 189 configured to press and fix a work W101. When the cutting machine 101 performs a cutting process to a work W101, chips are generated. The chips scatter and adhere to respective parts of the cutting machine 101.

Under this cutting environment, there is a possibility that the chips adhering to the cutting machine 101 might fall down therefrom and adhere to a succeeding work W101 to be processed. For example, there is a possibility that the chips might adhere to a support-receiving part 117 of the work W101, with which the supporting part 189 of the cutting machine 101 is brought into contact. When the work W101 is pressed by the supporting part 189 of the cutting machine 101 under the state in which the chips adhere to the support-receiving part 117 of the work W101, dents (indentations) may be formed in the support-receiving part 117 of the work W101, because of existence of the chips adhering to the support-receiving part 117.

In order to prevent the formation of these dents, the supporting part 189 of the cutting machine 101 has an opening 176, which is configured to eject an air supplied from an air supply source, not shown, so as to blow away the chips adhering to the supporting part 189 of the cutting machine 101 and to the support-receiving part 117 of the work W101 (see JP2001-47311A and JP2002-254245A).

A principle of removing the chips by an air ejected from the opening 176 is described. Before the work W110 is pressed by the supporting part 189 of the cutting machine 101 (a state shown by the left half section of FIG. 5), an air is supplied from the air supply source, which is not shown, and then the air is ejected from the opening 176. Thus, the chips on the support-receiving part 117 of the work W101 are blown away. Then, as the supporting part 189 of the cutting machine 101 is lowered to come closer to the support-receiving part 117 of the work W101, the air ejected from the opening 176 collides against the support-receiving part 117 of the work W101 more strongly and rebounds therefrom partially. The rebounded air then hits against the supporting part 189 of the cutting machine 101, so that the chips on the supporting part 189 are blown away (see JP2006-326761A).

SUMMARY OF THE INVENTION

However, in the above conventional chip removing method, since the air rebounded from the support-receiving part 117 of the work W101 and hitting against the supporting part 189 of the cutting machine 101 is only a part of the air that has collided against the support-receiving part 117 of the work W101, there is a possibility that a pressure (a chip blowing force) of the air hitting against the supporting part 189 might be insufficient for removing the chips thereon.

The present invention has been made in order to solve the aforementioned problem. The object of the present invention is to provide a method for removing chips and also an apparatus therefore, which can reliably remove chips both on a supporting part of a cutting machine and on a support-receiving part of a work. In addition, as a broader concept, the object of the present invention is to provide a method for removing chips and an apparatus therefore, which can reliably remove chips on two or more predetermined locations among surfaces of respective parts of a cutting machine and of respective parts of a work.

The present invention is a method for removing chips on a cutting machine, the method comprising: a first step in which an air supplied from an air supply source is introduced to a first opening and is ejected from the first opening, so that an airflow having a predetermined chip blowing force is blown onto a first region among surfaces of respective parts of the cutting machine and respective parts of a work; and a second step in which a moving member having a communication path extending from an air inlet port to a second opening is moved to a position at which the air inlet port is communicated with the first opening, so that the air is ejected from the second opening and thus an airflow having a predetermined chip blowing force is blown onto a second region among the surfaces of the respective parts of the cutting machine and the respective parts of the work.

According to the present invention, after the chips on the first region have been removed by ejecting thereto an air from the first opening in the first step, the chips on the second region are removed by ejecting thereto an air from the second opening in the second step. That is, the pressure of the ejected air can be always high, compared with the conventional case wherein the chip-removing process (air-blowing) is conducted at the same time for the first and the second regions. Thus, the chips on both the first and the second regions can be reliably removed by an airflow having a predetermined chip blowing force. In addition, as an air to be ejected from the second opening, the air ejected from the first opening is used with the aid of the communication path of the moving member. Thus, the air-supply system is simple, and the air is efficiently used.

Preferably, the first region is a supporting part of the cutting machine, the supporting part being configured to press and fix the work; and the second region is a support-receiving part of the work, with which the supporting part of the cutting machine is brought into contact. In this case, it can be effectively prevented that chips adhere to the supporting part of the cutting machine and/or the support-receiving part of the work, whereby it can be effectively avoided that so-called dents (indentations) are generated.

In addition, the present invention is an apparatus for removing chips on a cutting machine, the apparatus comprising: an air supply source configured to supply an air; a first opening configured to eject the air supplied from the air supply source; a moving member having a communication path extending from an air inlet port to a second opening; and a driving member configured to move the moving member between a first position at which the air inlet port and the first opening are not communicated with each other, and a second position at which the air inlet port and the first opening are communicated with each other.

According to the present invention, the aforementioned method for removing chips of a cutting machine can be carried out in a significantly easy manner.

Preferably, the driving member is configured to move a supporting part of the cutting machine, which is configured to press and fix the work, toward a support-receiving part of the work, and further to press the supporting part of the cutting machine onto the support-receiving part of the work. Namely, it is preferable that an operation of moving the moving member and an operation of pressing and fixing the work are performed by a common driving member.

Further, preferably, at the first position, the air ejected from the first opening is blown onto the supporting part of the cutting machine; at the second position, the air ejected from the second opening via the first opening is blown onto the support-receiving part of the work. In this case, it can be effectively prevented that chips adhere to the supporting part of the cutting machine and/or the support-receiving part of the work, whereby it can be effectively avoided that so-called dents (indentations) are generated.

Furthermore, for example, at the first position, the air ejected from the first opening is blown onto a surface of the supporting part of the cutting machine from an inwardly lateral side of the surface of the supporting part.

In this case, preferably, at the first position, the air ejected from the first opening is blown onto the surface of the supporting part of the cutting machine, from the inwardly lateral side of the surface of the supporting part, at an inclined angle of between 5° and 30° with respect to the surface of the supporting part. In this case, chips on the surface of the supporting part of the cutting machine can be more reliably removed.

Still furthermore, for example, at the second position, the air ejected from the second opening via the first opening is blown onto a surface of the support-receiving part of the work, from a side opposed to the surface of the support-receiving part.

In this case, preferably, at the second position, the air ejected from the second opening via the first opening is blown onto the surface of the support-receiving part of the work, from the side opposed to the surface of the support-receiving part, at an outwardly inclined angle of between 5° and 15° with respect to a normal line of the surface of the support-receiving part. In this case, chips on a surface of the support-receiving part of the work can be more reliably removed.

BEST MODE FOR CARRYING OUT THE INVENTION

An embodiment of the present invention will be described in detail below with reference to the drawings.

Figure 1:
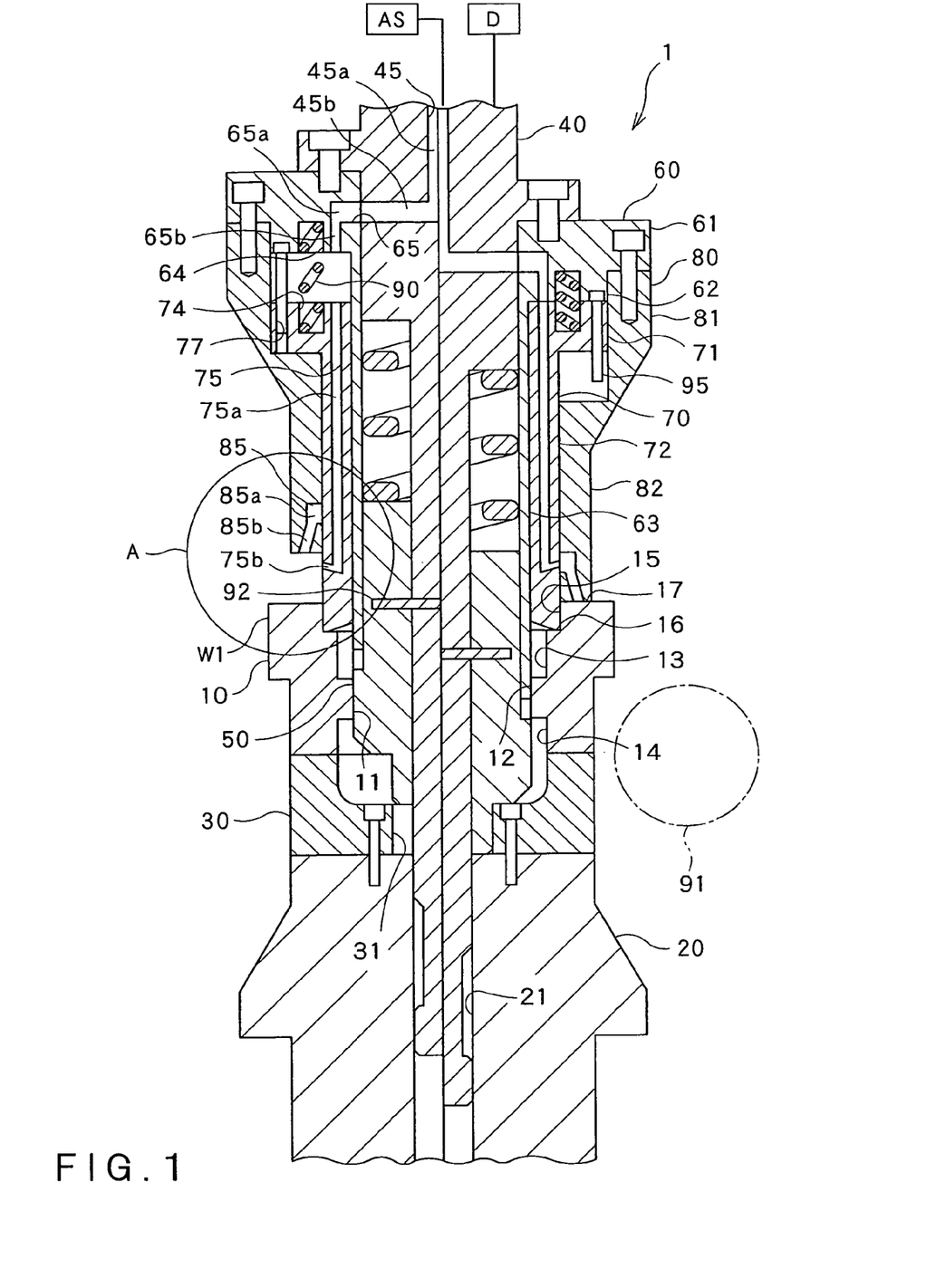
FIG. 1 is a sectional view of a cutting machine; which has an apparatus for removing chips of one embodiment according to the present invention. A left half section shows a state in which a work is not yet pressed and fixed, and a right half section shows a state in which a work has been already pressed and fixed.
Figure 2A:
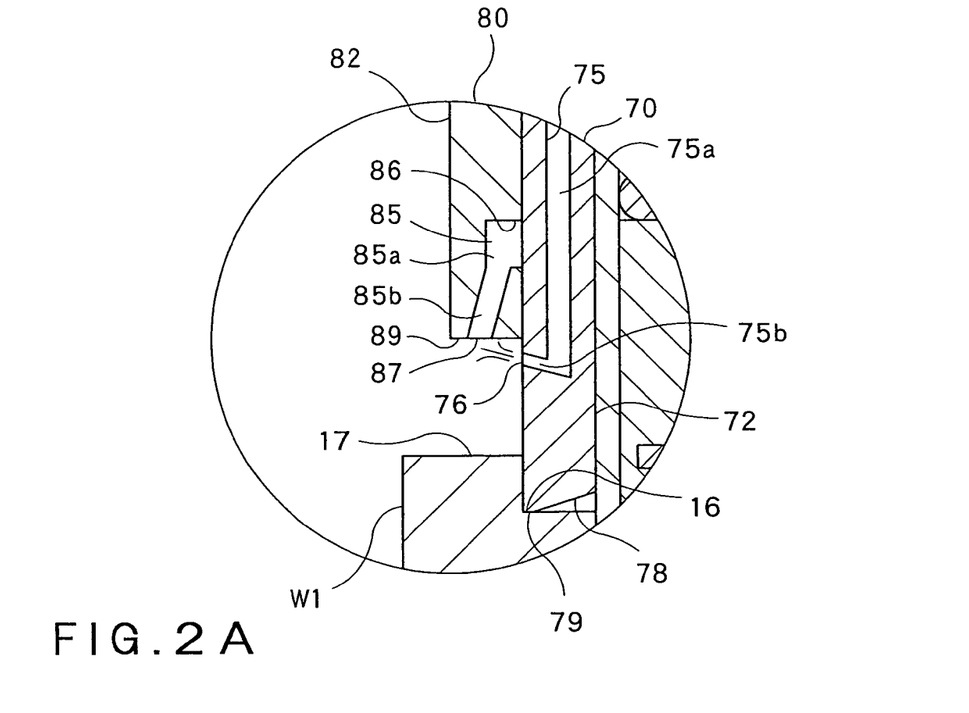
FIG. 2A is an enlarged view of a part A in FIG. 1. Under the state shown in FIG. 2A, an air is blown from a first opening onto a first region (a supporting part of the cutting machine).
Figure 2B:
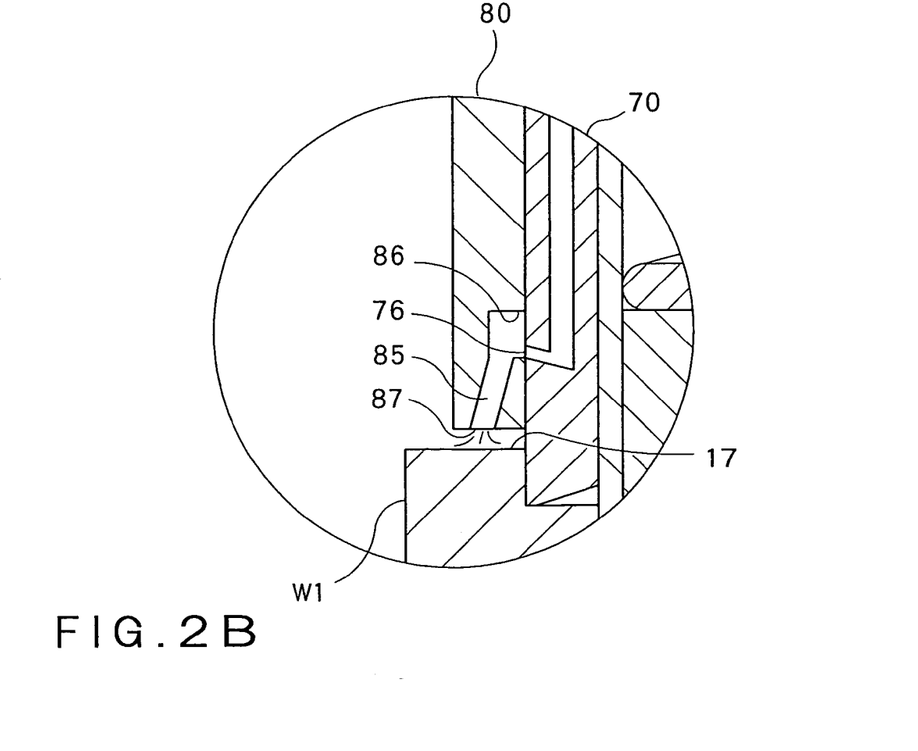
FIG. 2B shows a state in which a clamper as a moving member has been lowered from the state shown in FIG. 2A. Under the state shown in FIG. 2B, an air is blown from a second opening onto a second region (a support-receiving part of a work).
Figure 3A:
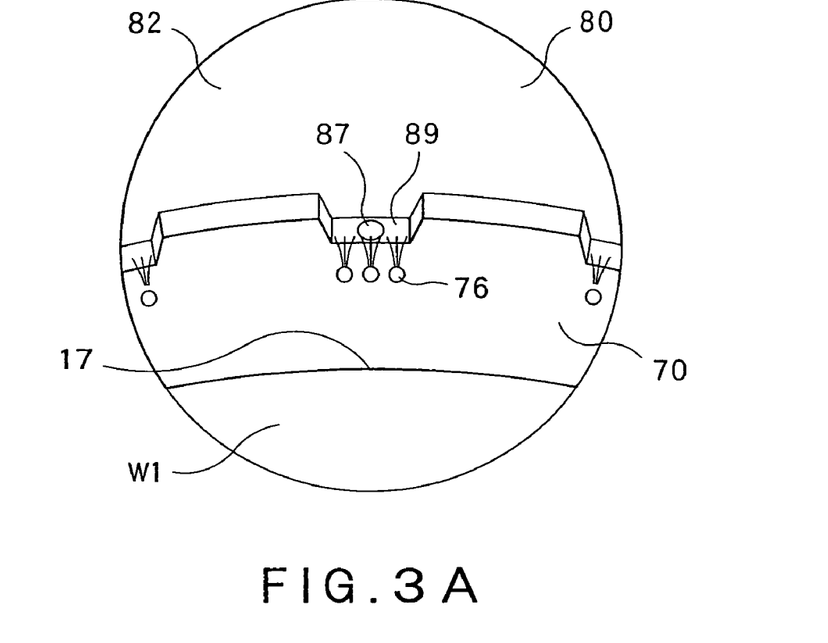
FIG. 3A is a perspective view of FIG. 2A.
Figure 3B:
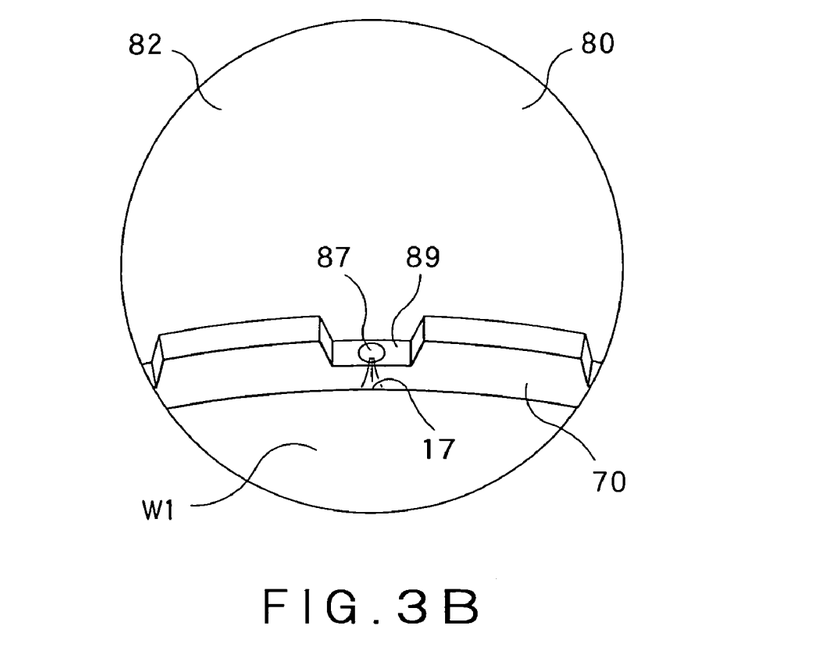
FIG. 3B is a perspective view of FIG. 2B.

FIG. 1 is a sectional view of a cutting machine, which has an apparatus for removing chips of one embodiment according to the present invention. A left half section shows a state in which a work is not yet pressed and fixed, and a right half section shows a state in which a work has been already pressed and fixed. FIG. 2A is an enlarged view of a part A in FIG. 1. Under the state shown in FIG. 2A, an air is blown from a first opening onto a first region (supporting part of the cutting machine). FIG. 2B shows a state in which a clamper as a moving member has been lowered from the state shown in FIG. 2A. Under the state shown in FIG. 2B, n air is blow-n form a second opening onto a second region (a support-receiving part of a work). FIG. 3A is a perspective view of FIG. 2A, and FIG. 3B is a perspective view of FIG. 2B.

The cutting machine 1 having the apparatus for removing chips of the one embodiment of the present invention is a machine for cutting a work W1. At first, the work W1 is described. The work W1 is formed to have a substantially cylindrical shape. More exactly, an upper part of the work W1 has a larger diameter, i.e., there is formed a work outward-convex part 10 that is convexed (protruded) radially outward. The work W1 has a work shaft hole 11 passing through an axial center thereof.

The work shaft hole 11 is provided, at substantially a central portion in an axial direction thereof, with a work inward-convex part 12 that is convexed (protruded) radially inward. An upper part than the work inward-convex part 12 is an inside surface 13, whose inside diameter is larger than that of the work inward-convex part 12. A lower part than the work inward-convex part 12 is an inside surface 14, whose inside diameter is also larger than that of the work inward-convex part 12. Further, formed on an upper end side of the work shaft hole 11 (on an upper end side of the inside surface 13) is a work inward-concave part 15 that is concaved (recessed) radially outward (an inside diameter of the work inward-concave part 15 is larger than that of the inside surface 13). The step formed between the inside surface 13 and the work inward-concave part 15 functions as a temporary support-receiving part 16 of a pusher 70, which is described below. In addition, an upper end surface of the work outward-convex part 10 functions as a support-receiving part (second region) 17, with which a below-described clamper 80 is brought into contact.

Next, the cutting machine 1 for cutting the work W1 (a hobbing machine in the case of this embodiment) is described. In a lower area of the cutting machine 1, there are disposed a fixed stage 20 and a support stage 30 fastened to and upper end of the fixed stage 20 by a bolt. In the fixed stage 20, there is formed a fixed-stage shaft hole 21 axially passing through an axial center of the fixed stage 20. In the support stage 30, there is formed a support-stage shaft hole 31 axially passing through an axial center of the support stage 30. An inside diameter of the support-stage shaft hole 31 is larger than that of the fixed-stage shaft hole 21.

A center shaft 40 is disposed on an upper area of the cutting machine 1. On an axially central portion of the center shaft 40, there is secured a substantially cylindrical member 50 by a pin 92. A guide 60 having a substantially cylindrical shape is disposed radially outside the member 50 and also radially outside a larger diameter part of the center shaft 40, which is an upper part of the center shaft 40. The guide 60 is fastened by a vertically (in parallel to the axial direction) extending bolt to a flange part of the center shaft 40, which is positioned still above the larger diameter part of the center shaft 40. Further, the substantially cylindrical pusher 70 is disposed radially outside the guide 60. Furthermore, the substantially cylindrical clamper 80 is disposed radially outside the pusher 70. The clamper 80 is fastened by a vertically (in parallel to the axial direction) extending bolt to a flange part (a first outward convex part 61) of the guide 60, which is an upper end of the guide 60. The work W1 is temporarily fixed by the pusher 70 on the support stage 30, and then pressed and fixed thereon by the clamper 80. A hob cutter 91 is provided in a vicinity of an outside portion of the work W1 in such a manner that the outside portion of the work W1 can be cut.

Next, the guide 60, the pusher 70 and the clamper 80 are described in detail.

The guide 60 has, on an upper end side thereof, a first outward convex part 61 (flange part) that is convexed (protruded) radially outward. A second outward convex part 62 is formed continuously from a lower part of the first outward convex part 61. An outside diameter of the second outward convex part 62 is smaller than that of the first outward convex part 61. In addition, a cylindrical guide part 63 extending vertically (in the axial direction) downward is formed continuously from a lower part of the second outward convex part 62.

The pusher 70 has, on an upper end side thereof, an outward convex part 71 (flange part) that is convexed (protruded) radially outward. A cylindrical pusher guide part 72 extending vertically (in the axial direction) downward is formed continuously from the outward convex part 71. As shown in FIG. 2A, formed on a lower end of the pusher guide part 72 is a contact part (for temporal fixation) 79 for temporarily fixing a work W1. Namely, a tapered cutout part 78 is formed on the lower end surface of the pusher guide part 72 such that the contact part 79 comes in contact with the work W1 only at a circular line (an area of the contact part 79 that can come in contact with the work W is smaller).

The clamper 80 has, on an upper end side thereof, a clamper larger-diameter part 81 that is convexed (protruded) radially outward. On the other hand, the clamper 80 has, on a lower side thereof, a cylindrical clamper guide part 82, whose outside diameter is smaller than that of the clamper larger-diameter part 81. The clamper larger-diameter part 81 and the clamper guide part 82 are connected to each other by a tapered part. As shown in FIG. 2A, a lower end surface of the clamper guide part 82 functions as a supporting part (first region) 89 for pressing and fixing a work W1.

As shown in FIGS. 3A and 3B, the lower end surface of the clamper guide part 82 is not formed as a flat surface having a circumferentially constant height, but is formed as a plurality of projections, which is circumferentially arranged at equal intervals therebetween. A work W1 is pressed only by these projections. This structure is preferable in terms of prevention of generation of dents. In addition, this structure is preferable in terms of saving of a flow amount of an air ejected from a second opening 87, which will be described below.

A guide concave part 64 that is concaved (recessed) in the axial direction is formed in a lower surface of the second outward convex part 62 of the guide 60. In addition, a pusher concave part 74 that is concaved (recessed) in the axial direction is formed in an upper surface of the outward convex part 71 of the pusher 70. A coil spring 90 is disposed (fitted) in a space between the guide concave part 64 and the pusher concave part 74. Thus, after the pusher 70 has come in contact with the work W1 so as to be positioned (so as to be temporarily fixed: see the left half section of FIG. 1), the clamper 80 is capable of being further moved vertically (in the axial direction) downward. Since the clamper 80 can be further vertically (in the axial direction) moved under the state in which the work W1 is temporarily fixed by the pusher 70, the clamper 80 can function as a moving member in the present invention.

In addition, a positioning bolt 95 is also fitted in the lower surface of the second outward convex part 62 of the guide 60. A positioning hole 77, into which the positioning bolt 95 can be inserted, is formed in the upper surface of the outward convex part 71 of the pusher 70, so that the positioning bolt 95 is inserted into the positioning hole 77. Thus, the pusher 70 is prevented from being rotated with respect to the guide 60 and the clamper 80. Arranged on an upper end of the center shaft 40 is a driving member D, which vertically moves the center shaft 40, the guide 60, the pusher 70 and the clamper 80.

Next, there are described air supply paths disposed inside the cutting machine (hobbing machine) 1.

Center shaft paths 45 are formed as air supply paths of the center shaft 40 such that the center shaft paths 45 are communicated with an air supply source AS. Each of the center shaft paths 45 is composed of a common center vertical part 45a that is axially extended, and a center horizontal part 45b that is continuously extended from the center vertical part 45 in each radially outward direction. Distal ends of the respective center horizontal parts 45b are in communication with guide paths 65, which are air supply paths of the guide 60.

Each of the guide paths 65 of the guide 60 is composed of a guide horizontal part 65a that is continuously extended from the corresponding center horizontal part 45b in the corresponding radially outward direction, and a guide vertical part 65b that is continuously extended from the guide horizontal part 65a in the axial direction. Distal ends of the respective guide perpendicular parts 65b are in communication with pusher paths 75, which are air supply paths of the pusher 70.

Each of the pusher paths 75 of the pusher 70 is composed of a pusher vertical part 75a that is axially extended, and a pusher inclined part 75b that is continuously extended from the pusher perpendicular part 75a in each corresponding radially outward direction in an inclined manner with respect to the horizontal plane. In details, the pusher inclined part 75b is extended in an upwardly inclined direction at about 15° with respect to the horizontal plane (a surface perpendicular to the axial direction). This angle is preferably between 5° and 30°. As shown in FIGS. 2A and 3A, a first opening 76 for ejecting an air is formed in a distal end of each pusher inclined part 75b. Under the state in which the pusher 70 is in contact with the work W1 so as to be positioned and to be temporarily fixed (the state shown in the left half section of FIG. 1), the first opening 76 is located at a position from which an air can be blown onto the lower end surface of the clamper 80, which is the supporting part of the cutting machine 1.

Each of communication paths 85 that are air supply paths of the clamper 80 is composed of a clamper horizontal part 85a that is extended radially outward from an air inlet port 86 formed in an inner circumferential surface of the clamper 80, and a clamper inclined part 85b that is continuously extended from the clamper horizontal part 85a in each corresponding radially outward direction in an inclined manner. In details, the clamper inclined part 85b is extended in an outwardly inclined direction at about 10° with respect to the axial direction. This angle is preferably between 5° and 15°. A second opening 87 for ejecting an air is formed in a distal end of each clamper inclined part 85b. In this example, the second opening 87 is formed in a radially central portion of each projection of the clamper 80 (each lower end surface of the clamper 80) that functions as the work supporting part.

As described above, as shown in FIGS. 3A and 3B, the lower end surface of the clamper guide part 82 is not formed as a flat surface having a circumferentially constant height, but is formed as the plurality of projections that are circumferentially arranged at equal intervals therebetween. The work W1 is pressed only by these projections. In this embodiment, as shown in FIGS. 3A and 3B, one second opening 87 is formed in each of the projections, and three first openings 76 are formed for each of the projections. After the clamper 80 is lowered so that all the three first openings 76 are once closed, all the three central first openings 76 can be communicated with the corresponding air inlet port 86 of the clamper 80.

Regarding the supporting part 89, an interval between the projections that are circumferentially separated from each other and/or the numbers and the dimensions of the second openings 87 and the first openings 76 to be formed in and for each of the projections can be suitably determined in order that chips on the projections as well as chips on the work W to be pressed by these projections can be reliably removed.

Next, there is described a method for pressing and fixing a work W1 with the use of the aforementioned pusher 70 and the clamper 80.

Under the state in which the work W1 is not yet supported by the cutting machine (hobbing machine) 1, the center shaft 40, the cylindrical member 50, the guide 60, the pusher 70 and the clamper 80 are separated from the fixed stage 20 and the support stage 30.

After the work W1 has been placed on an upper side of the support stage 30 by a chuck, not shown, the center shaft 40 is lowered so as to pass through the work shaft hole 11 of the work W1, the support-stage shaft hole 31 of the support stage 30, and the fixed-stage shaft hole 21 of the fixed stage 20, in this order. As shown in the left half section of FIG. 1, when the center shaft 40 is lowered, the cylindrical member 50, which is lowered together with the center shaft 40, is guided by the work inward-convex part 12 of the work W1. Then, as shown in FIG. 2A, the contact part 79 (for a temporal fixation) of the pusher 70, which is lowered together with the center shaft 40, is brought into contact with the temporary support-receiving part 16 of the work W1, so that the work W1 is positioned (temporarily fixed). At this time, the first openings 76 of the pusher 70 are located at positions opposed to the lower end surface (supporting part) 89 of the clamper 80.

Then, as shown in the right half section of FIG. 1, when the center shaft 40 is further lowered, a smaller diameter part on the lower end side of the cylindrical member 50 is guided by the support-stage shaft hole 31 of the support stage 30. In addition, the lower end of the guide 60, which is lowered together with the center shaft 40, is guided by the work inward-convex part 12 of the work W1. Then, the supporting part 89 of the clamper 80, which is lowered together with the center shaft 40, comes into contact with the support-receiving part 17 of the work W1 and presses the same. Thus, an operation of pressing and fixing the work W1 is completed.

Thereafter, the work W1 fixed by the guide 60, the pusher 70 and the clamper 80 is subjected to, e.g., a gear-teeth cutting process, by means of the hob cutter 91, while the work W1 is being rotated. During this gear-teeth cutting process, chips are generated and they scatter and adhere to the clamper 80, for example.

Next, there is described a method for removing chips adhering to the supporting part 89 of the clamper 80 and to the support-receiving part 17 of the work W1, in the case wherein the work W1 is fixed by the pusher 70 and the clamper 80.

When the operation for placing the work W1 onto the cutting machine (hobbing machine) is started, an air is supplied from the air supply source AS. As shown in FIGS. 2A and 3A, the air is ejected from the first openings 76 of the pusher 70 through the center shaft paths 45, the guide paths 65, and the pusher paths 75. Herein, the first openings 76 are positioned on a lateral side of the supporting part 89 of the clamper 80, and the first openings 76 can eject the air at an upward angle of about 15° toward the supporting part 89 of the clamper 80. Thus, the air ejected from the first openings 76 can reliably remove the chips adhering to the supporting part 89 of the clamper 80.

Thereafter, as shown in FIG. 2B, the clamper 80 is moved toward the work W1, while the pusher 70 is pressing the work W1 in position. At this time, the first openings 76 formed in the pusher 70 are closed (covered) by the clamper 80, and then the predetermined sets of the first openings 76 and the air inlet ports 86 are communicated with each other. Under this state, as show in FIGS. 2B and 3B, the air ejected from the first openings 76 is ejected from the second openings 87 of the clamper 80 through the air inlet ports 86 and the communication paths 85 of the clamper 80. At this time, the second openings 87 can eject the air from the side opposed to the support-receiving part 17 at an outwardly inclined angle of about 10° with respect to a normal line of a surface of the support-receiving part 17. Thus, the air ejected from the second openings 87 can reliably remove the chips adhering to the supposed part 17 of the work W1.

Therefore, the work W1 can be pressed and fixed, with no chip adhering to the supporting part 89 of the clamper 80 and the supposed part 17 of the work W1.

According to the above method for removing chips on the cutting machine, after the chips on the work supporting part 89 of the clamper 80 have been removed by ejecting the air from the first openings 76, the chips on the support-receiving part 17 of the work W1 are removed by ejecting the air from the second openings 87. That is, the pressure of the ejected air can be always high, compared with the conventional case wherein the chip-removing process (air-blowing) is conducted at the same time for the supporting part and the support-receiving part. Thus, the chips on the'supporting part 89 of the clamper 80 and the chips on the support-receiving part 17 of the work W1 can be reliably removed by an airflow having a predetermined chip blowing force. In addition, as the air to be ejected from the second opening 87, the air ejected from the first opening 76 is used with the aid of the communication path 85 of the clamper 80. Thus, the air-supply system is simple, and the air is efficiently used. Therefore, generation of so-called dents can be effectively avoided.

In addition, according to the above apparatus for removing chips on a cutting machine, the aforementioned method for removing chips on the cutting machine can be significantly easily realized.

Figure 4:
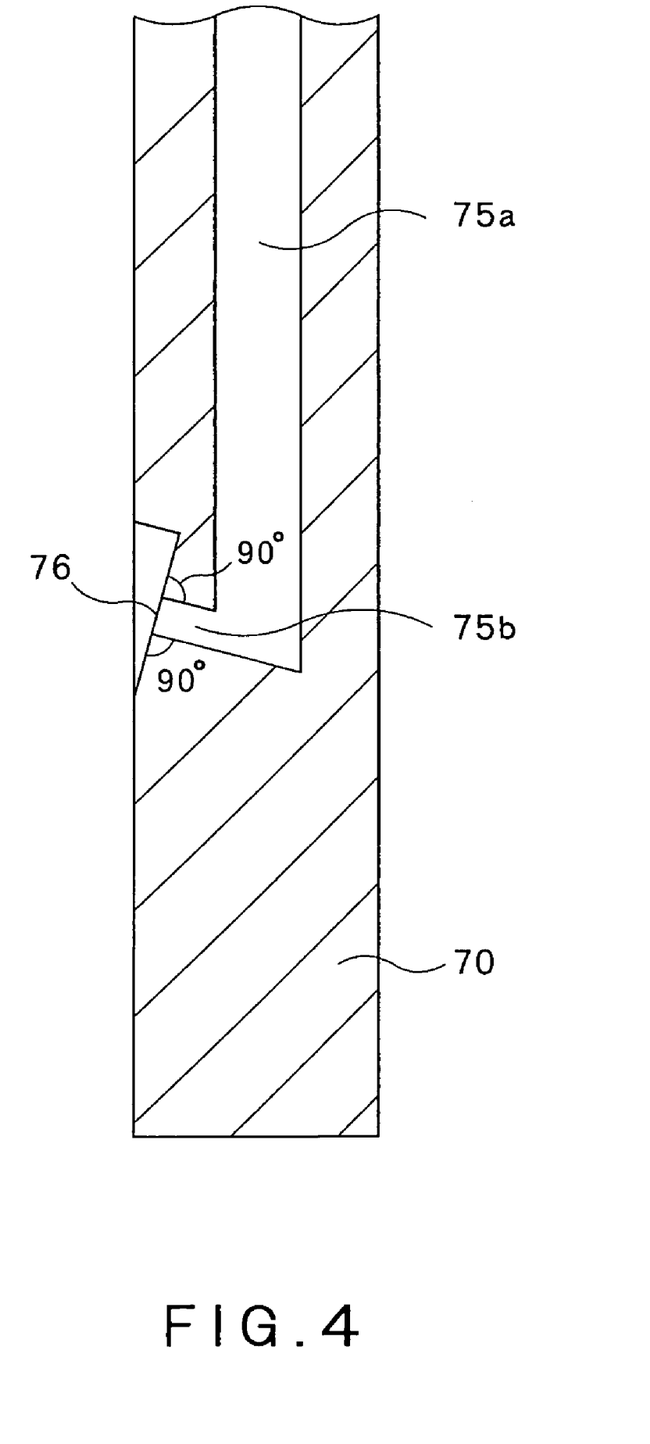
FIG. 4 is a view showing another example of the first opening.

There can be employed a structure shown in FIG. 4 as a shape surrounding the first opening 76. The illustrated part of the pusher 70 shown in FIG. 4 corresponds to the part shown by FIGS. 2A and 2B. In the structure shown in FIG. 4, a part surrounding the first opening 76 is spot-faced by means of a drill having a diameter larger than that of the first opening 76, such that an opening surface of the first opening 76 is perpendicular to an opening direction of the first opening 76. However, in view of the various experiments conducted by the inventor, it seems preferable that, as shown in FIGS. 2A and 2B, an outer circumferential surface of the pusher 70 is a normal cylindrical surface (there is no spot-facing), because entering of chips is unlikely to occur.

In the above embodiment, although the first openings 76 are formed in the pusher 70, the first openings 76 may be formed in another member. In addition, although there has been described the example in which the clamper 80 serves as a moving member, the moving member is not limited to the clamper 80 as long as the moving member can close the first openings 76 and is provided with the air inlet port 86, the communication paths 85 and the second openings 87. Further, there has been described the example in which an air ejected from the first openings 76 is blown onto the supporting part 89 of the cutting machine 1, the air may be blown onto the support-receiving part 17 of the work W1. In this case, it is preferable that an air ejected from the second openings 87 is blown onto the supporting part of the cutting machine 1.

Moreover, in the above embodiment, although the drive member D for moving the clamper 80 as a moving member serves also as a driving member for moving the supporting part 89 of the cutting machine 1 toward the support-receiving part 17 of the work W1, the present invention is not limited thereto. Namely, an operation of moving the moving member and an operation of pressing and fixing a work may be performed by separate driving members. However, it is preferable that the operation of moving the moving member and the operation of pressing and fixing a work are performed by a common driving member, which has been explained in the above embodiment, in terms of an effective utilization of space, in which members are installed, and a cost required for the members.

The invention claimed is:

1. A method for removing chips on a cutting machine, the method comprising:
   a first step in which an air supplied from an air supply source is introduced to a first opening and is ejected from the first opening, so that an airflow having a predetermined chip blowing force is blown onto a first region among surfaces of respective parts of the cutting machine and respective parts of a work; and
   a second step in which a moving member having a communication path extending from an air inlet port to a second opening is moved to a position at which the air inlet port is communicated with the first opening, so that the air is ejected from the second opening and thus an airflow having a predetermined chip blowing force is blown onto a second region among the surfaces of the respective parts of the cutting machine and the respective parts of the work, wherein
   the first region is a supporting part of the cutting machine, the supporting part being configured to press and fix the work; and
   the second region is a support-receiving part of the work, with which the supporting part of the cutting machine is brought into contact.

2. An apparatus for removing chips on a cutting machine, the apparatus comprising:
   an air supply source configured to supply an air;
   a first opening configured to eject the air supplied from the air supply source;
   a moving member having a communication path extending from an air inlet port to a second opening; and
   a driving member configured to move the moving member between a first position at which the air inlet port and the first opening are not communicated with each other, and a second position at which the air inlet port and the first opening are communicated with each other,
   wherein the driving member is configured to move a supporting part of the cutting machine, which is configured to press and fix the work, toward a support-receiving part of the work, and further to press the supporting part of the cutting machine onto the support-receiving part of the work.

3. The apparatus for removing chips on a cutting machine according to claim 2, wherein:
   at the first position, the air ejected from the first opening is blown onto the supporting part of the cutting machine;
   at the second position, the air ejected from the second opening via the first opening is blown onto the support-receiving part of the work.

4. The apparatus for removing chips on a cutting machine according to claim 3, wherein
   at the first position, the air ejected from the first opening is blown onto a surface of the supporting part of the cutting machine from an inwardly lateral side of the surface of the supporting part.

5. The apparatus for removing chips on a cutting machine according to claim 4, wherein
   at the first position, the air ejected from the first opening is blown onto the surface of the supporting part of the cutting machine, from the inwardly lateral side of the surface of the supporting part, at an inclined angle of between 5° and 30° with respect to the surface of the supporting part.

6. The apparatus for removing chips on a cutting machine according to claim 3, wherein
   at the second position, the air ejected from the second opening via the first opening is blown onto a surface of the support-receiving part of the work, from a side opposed to the surface of the support-receiving part.

7. The apparatus for removing chips on a cutting machine according to claim 6, wherein
   at the second position, the air ejected from the second opening via the first opening is blown onto the surface of the support-receiving part of the work, from the side opposed to the surface of the support-receiving part, at an outwardly inclined angle of between 5° and 15° with respect to a normal line of the surface of the support-receiving part.

* * * * *